US007738892B2

(12) United States Patent
Ayyasamy et al.

(10) Patent No.: US 7,738,892 B2
(45) Date of Patent: *Jun. 15, 2010

(54) ARCHITECTURE, CLIENT SPECIFICATION AND APPLICATION PROGRAMMING INTERFACE (API) FOR SUPPORTING ADVANCED VOICE SERVICES (AVS) INCLUDING PUSH TO TALK ON WIRELESS HANDSETS AND NETWORKS

(75) Inventors: Ravi Ayyasamy, Richardson, TX (US); Krishnakant M. Patel, Richardson, TX (US)

(73) Assignee: Kodiak Networks, Inc., San Ramon, CA (US)

( * ) Notice: Subject to any disclaimer, the term of this patent is extended or adjusted under 35 U.S.C. 154(b) by 1160 days.

This patent is subject to a terminal disclaimer.

(21) Appl. No.: 11/126,587

(22) Filed: May 11, 2005

(65) Prior Publication Data
US 2005/0202807 A1  Sep. 15, 2005

Related U.S. Application Data

(63) Continuation-in-part of application No. 10/515,556, filed as application No. PCT/US03/16386 on May 23, 2003, application No. 11/126,587, which is a continuation-in-part of application No. PCT/US2004/023038, filed on Jul. 16, 2004.

(60) Provisional application No. 60/569,953, filed on May 11, 2004, provisional application No. 60/579,309, filed on Jun. 14, 2004, provisional application No. 60/382,981, filed on May 24, 2002, provisional application No. 60/383,179, filed on May 24, 2002, provisional application No. 60/407,168, filed on Aug. 30, 2002, provisional application No. 60/488,638, filed on Jul. 18, 2003, provisional application No. 60/492,650, filed on Aug. 5, 2003, provisional application No. 60/576,094, filed on Jun. 2, 2004.

(51) Int. Cl.
*H04M 1/00* (2006.01)
*H04H 20/71* (2008.01)
(52) U.S. Cl. .................. 455/518; 455/519; 455/517; 455/418
(58) Field of Classification Search .................. 455/519, 455/518, 517, 553.1, 428, 560, 439, 418, 455/419
See application file for complete search history.

(56) References Cited

U.S. PATENT DOCUMENTS 5,711,011 A  1/1998  Urs et al.
(Continued)

FOREIGN PATENT DOCUMENTS

WO  WO 00/79825  12/2000
(Continued)

OTHER PUBLICATIONS

ETSI: "ETSI TS 100 812-2 v2.3.1 Terrestrial Trunked Radio (TETRA) Subscriber Identity Module to Mobile Equipment (SIM-ME) interface; Part 2: Universal Integrated Circuit Card (UICC) Characteristics of the TSIM application", ETSI Technical Specification, Oct. 2003, pp. 1-141. XP002345779.
(Continued)

*Primary Examiner*—Melur Ramakrishnaiah
(74) *Attorney, Agent, or Firm*—Gates & Cooper LLP

(57) ABSTRACT

An architecture, client specification and application programming interface (API) for supporting advanced voice services (AVS) for use in handsets in order to support advanced voice services (AVS) for wireless communications systems. The handset or mobile unit executes a client application therein for performing the call setup and in-band signaling with the wireless network for the group voice services, and executes a presence/group management application therein for performing presence and group management functions related to the group voice services in the mobile unit.

14 Claims, 5 Drawing Sheets

U.S. PATENT DOCUMENTS

| | | | |
|---|---|---|---|
| 5,987,318 | A | 11/1999 | Alperovich et al. |
| 6,021,326 | A | 2/2000 | Nguyen |
| 6,138,011 | A | 10/2000 | Sanders, III et al. |
| 6,304,558 | B1 | 10/2001 | Mysore |
| 6,411,815 | B1 | 6/2002 | Balasuriya |
| 6,477,366 | B1 | 11/2002 | Valentine et al. |
| 6,661,878 | B1 | 12/2003 | Mirashrafi et al. |
| 2001/0005372 | A1 | 6/2001 | Cave et al. |
| 2003/0016632 | A1 | 1/2003 | Refai et al. |
| 2003/0078064 | A1 | 4/2003 | Chan |
| 2003/0190888 | A1 | 10/2003 | Mangal et al. |
| 2004/0057449 | A1 | 3/2004 | Black |
| 2004/0259580 | A1 | 12/2004 | Florkey et al. |
| 2005/0143135 | A1* | 6/2005 | Brems et al. ................. 455/564 |
| 2005/0202807 | A1 | 9/2005 | Ayyasamy et al. |
| 2005/0221819 | A1 | 10/2005 | Patel et al. |
| 2005/0239485 | A1* | 10/2005 | Kundu et al. ................. 455/519 |
| 2005/0254464 | A1 | 11/2005 | Patel et al. |
| 2005/0261016 | A1 | 11/2005 | Patel et al. |
| 2006/0019654 | A1 | 1/2006 | Farrill |
| 2006/0030347 | A1 | 2/2006 | Biswas |
| 2006/0189337 | A1 | 8/2006 | Farrill et al. |
| 2006/0234687 | A1 | 10/2006 | Patel et al. |
| 2007/0037597 | A1 | 2/2007 | Biswas et al. |
| 2007/0037598 | A1 | 2/2007 | Ayyasamy et al. |

FOREIGN PATENT DOCUMENTS

| | | |
|---|---|---|
| WO | WO2005009006 | 12/2000 |
| WO | WO 03/101007 | 12/2003 |
| WO | WO2005112494 | 11/2005 |
| WO | WO2005115032 | 12/2005 |
| WO | WO2005117474 | 12/2005 |
| WO | WO2006105287 | 10/2006 |

OTHER PUBLICATIONS

Nokia: "What is TETRA? Why Nokia TETRA?", The Nokia TETRA Primer, 2002, pp. 1-29. XP002345778 http://www.nokia.com/downloads/solutions/government/SD114EN_gov.pdf.

Skype: "Skype". Web Archive—Skype, May 22, 2004, pp. 1-2. XP002345780 http://web.archive.org/web/20040522201727 http://www.skype.com.

Trachwell: "TrackWell Software and Tetra Iceland deliver value added services to Tetra users", TRACKWELL.COM, Oct. 2002, pp. 1-1. XP002345781 http://www.trackwell.com/news/news_twandtetra.htm.

* cited by examiner

ARCHITECTURE, CLIENT SPECIFICATION AND APPLICATION PROGRAMMING INTERFACE (API) FOR SUPPORTING ADVANCED VOICE SERVICES (AVS) INCLUDING PUSH TO TALK ON WIRELESS HANDSETS AND NETWORKS

CROSS REFERENCE TO RELATED APPLICATIONS

This application claims the benefit under 35 U.S.C. Section 119(e) of the following co-pending and commonly-assigned U.S. provisional patent applications:

Ser. No. 60/569,953, filed on May 11, 2004, by Ravi Ayyasamy and Krishnakant Patel, entitled PRESS TO TALK CLIENT APPLICATION PROGRAMMING INTERFACE (PCAPI); and Ser. No. 60/579,309, filed Jun. 14, 2004, by Ravi Ayyasamy, Krishnakant Patel, and Gorachand Kundu, entitled CLIENT SPECIFICATION AND ARCHITECTURE FOR SUPPORTING PRESS TO TALK AND OTHER PREMIUM VOICE SERVICES IN WIRELESS NETWORKS;

both of which applications are incorporated by reference herein.

This application is a continuation-in-part and claims the benefit under 35 U.S.C. Sections 119, 120 and/or 371 of the following co-pending and commonly-assigned patent applications:

Ser. No. 10/515,556, filed on Nov. 23, 2004, by Gorachand Kundu, Ravi Ayyasamy, and Krishnakant Patel, entitled DISPATCH SERVICE ARCHITECTURE FRAMEWORK, which application claims the benefit under 35 U.S.C. Section 371 of the following co-pending and commonly-assigned PCT international patent application:

Serial No. PCT/US03/16386, filed on May 23, 2003, by Gorachand Kundu, Ravi Ayyasamy, and Krishnakant Patel, entitled DISPATCH SERVICE ARCHITECTURE FRAMEWORK, which application claims the benefit under 35 U.S.C. Section 119(e) of the following co-pending and commonly-assigned U.S. provisional patent applications:

Ser. No. 60/382,981, filed on May 24, 2002, by Gorachand Kundu, Ravi Ayyasamy, and Krishnakant Patel, entitled RADIO GATEWAY ARCHITECTURE FRAMEWORK;

Ser. No. 60/383,179, filed May 24, 2002, by Gorachand Kundu, Ravi Ayyasamy, and Krishnakant Patel, entitled DISPATCH SERVICE ARCHITECTURE FRAMEWORK; and Ser. No. 60/407,168, filed Aug. 30, 2002, by Gorachand Kundu, Ravi Ayyasamy, and Krishnakant Patel, entitled DISPATCH SERVICE ARCHITECTURE FRAMEWORK; and Serial No. PCT/US04/23038, filed on Jul. 16, 2004, by F. Craig Farrill, Bruce D. Lawler, and Krishnakant M. Patel, entitled PREMIUM VOICE SERVICES FOR WIRELESS COMMUNICATIONS SYSTEMS, which application claims the benefit under 35 U.S.C. Section 119(e) of the following co-pending and commonly-assigned U.S. provisional patent applications:

Ser. No. 60/488,638, filed on Jul. 18, 2003, by F. Craig Farrill, Bruce D. Lawler and Krishnakant Patel, entitled REAL-TIME EXCHANGE;

Ser. No. 60/492,650, filed Aug. 5, 2003, by Bruce D. Lawler, Krishnakant Patel, and F. Craig Farrill, entitled CDMA PRESS-TO-TALK (P2T) PROOF-OF-CONCEPT DEMONSTRATION; and Ser. No. 60/576,094, filed Jun. 2, 2004, by Craig Farrill, Bruce Lawler, and Krishnakant Patel, entitled TECHNIQUE FOR ZERO DELAY CALL SET-UP IN P2T SYSTEMS;

all of which applications are incorporated by reference herein.

BACKGROUND OF THE INVENTION

1. Field of the Invention

This invention relates in general to wireless communications systems, and more specifically, to an architecture, client specification and application programming interface (API) for supporting advanced voice services (AVS) including push-to-talk or press-to-talk on wireless handsets and networks.

2. Description of Related Art

Group-based voice services, such as two-way half-duplex voice calls within a group or between individuals, also known as "Push-to-Talk," "Press-to-Talk," PTT or P2T, have enormous revenue earnings potential for wireless networks, such as cellular networks and personal communications systems (PCS) networks. Corporate subscribers primarily use such services for coordinating field people or fleet users from a central location.

Currently, there are three major approaches employed in providing group-based voice services such as P2T in wireless networks. One approach requires the installation of a dedicated private network, parallel to the wireless network, to support the group-based voice services. NEXTEL uses such a system, based on a solution developed by MOTOROLA known as IDEN. However, a dedicated private network is costly to install and maintain and is employed by a few public wireless carriers. Also, the IDEN system is non-standard, and hence cannot be used in standard wireless communications networks, such as those based on CDMA and GSM.

Another approach is based on Voice over IP (VoIP) technologies. While this approach promises compliance with newer and emerging standards, such as GPRS (General Packet Radio Service), UMTS (Universal Mobile Telecommunications System), etc., it does not provide a solution for carriers employing wireless networks based on existing standards, such as GSM (Global System for Mobile Communications), CDMA (Code Division Multiple Access), etc. However, even for the newer standards, solutions based on VoIP have serious drawbacks, including slower call setup, significant overhead, increased susceptibility to packet losses, low bit rate voice coders (vocoders), and significant modifications to the mobile handset. There is a need, instead, for solutions that require only minimal upgrades to the handset.

Still another approach is that defined in the co-pending and commonly-assigned patent applications cross-referenced above and incorporated by reference herein. In this approach, group-based voice services are provided by a real-time exchange or dispatch gateway that interfaces to the wireless network to provide the group-based voice services therein, wherein both the real-time exchange and mobile handsets that use the group-based voice services communicate with each other using call setup and in-band signaling within the wireless network.

Notwithstanding these innovations, there is a need in the art for an architecture, client specification and application programming interface (API) for use in handsets in order to support advanced voice services (AVS) for wireless communications systems. The present invention aims to satisfy this need.

SUMMARY OF THE INVENTION

To overcome the limitations in the prior art described above, and to overcome other limitations that will become apparent upon reading and understanding the present specification, the present invention discloses an architecture, client specification and application programming interface (API) for use in handsets in order to support advanced voice services (AVS) for wireless communications systems. The handset or mobile unit executes a client application therein for performing the call setup and in-band signaling with the wireless network for the group voice services, and executes a presence/group management application therein for performing presence and group management functions related to the group voice services in the mobile unit.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Overview

The present invention provides an architecture, client specification and application programming interface (API) for supporting advanced voice services (AVS) on handsets used in wireless communications networks.

Network Architecture

Figure 1:
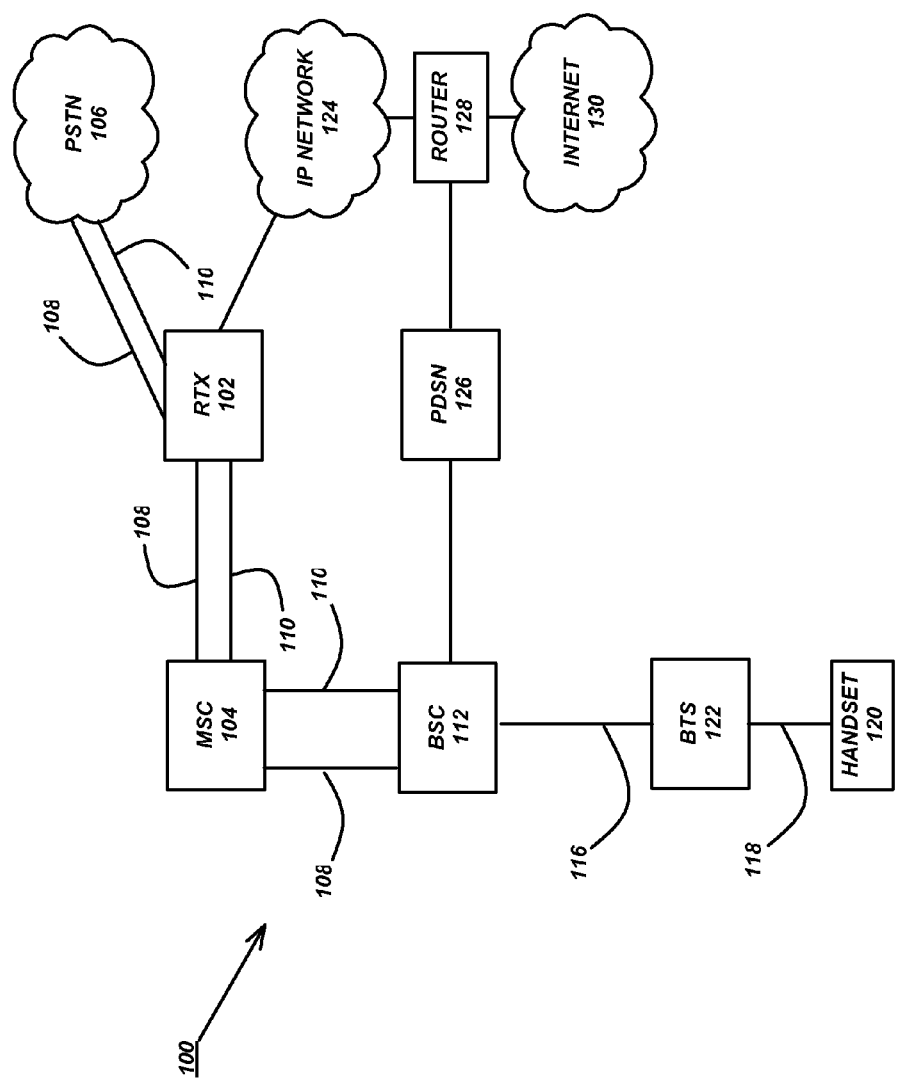
FIG. 1 is a block diagram that illustrates an exemplary embodiment of a wireless communications network according to a preferred embodiment of the present invention.

FIG. 1 is a block diagram that illustrates an exemplary embodiment of a wireless communications network according to a preferred embodiment of the present invention.

Within the network 100, an RTX (Real-Time Exchange) 102, previously known as a Dispatch Gateway (DG), communicates with a MSC (Mobile Switching Center) 104 and PSTN (Public Switched Telephone Network) 106 using SS7—ISUP/WIN/CAMEL (Signaling System 7—Integrated Services Digital Network User Part/Wireless Intelligent Network/Customized Applications for Mobile Enhanced Logic) messages at a signaling plane 108. A bearer path 110 implements a TDM (Time Division Multiplexing) interface carrying PCM (Pulse Code Modulation) or TFO (Tandem Free Operation) voice frames. Support for TFO in this path 110 is negotiated between a BSC (Base Station Controller) 112 and the RTX 102 for each originating and terminating leg of a group call. The use of TFO ensures high voice quality (as voice vocoder conversion is avoided) between mobile-to-mobile calls.

When a subscriber originates a group call, the MSC 104 routes the call to the RTX 102. The MSC 104 also requests the BSC 112 via 116 to establish a radio traffic path 118 with a mobile unit or handset 120 via the BTS (Base Transceiver Station) 122 (as it does for a normal cellular call). At this time, the BSC 112 tries to negotiate TFO (if it is supported) on a TDM link with the far end (in this case, the RTX 102).

At the same time (after the MSC 104 terminates the group call request to the RTX 102), the RTX 102 identifies the terminating group users and their MS-ISDN (Mobile Station—Integrated Services Digital Network) numbers. It sends an ISUP call origination request for each terminating handset 120. It may send requests directly to the MSC 104, PSTN 106 or IP network 124 via a PDSN (Public Data Switched Network) 126, Router 128, and/or Internet/Intranet 130, depending on the routing table configuration for terminating MS-ISDN numbers. Once the bearer path 110 is established, the RTX 102 begins a negotiation with the far end (in this case, the terminating BSC 112) for each terminating leg to a handset 120.

Once bearer paths 110 are established for originating and terminating legs for a group call, the RTX 102 switches (or duplicates) voice frames from the originating handset 120 to all terminating mobile handsets 120.

The RTX 102 may use an IP network 124 or the Internet/Intranet 130 for two different purposes. The IP network 124 or the Internet/Intranet 130 can be used in a toll bypass mode where two RTXs 102 can exchange voice traffic bypassing the PSTN 106. However, each RTX 102 is responsible for terminating traffic to its closest MSC 104. In this case, the IP network 124 or the Internet/Intranet 130 is used as a backbone transport of voice traffic between two RTXs 102.

The IP network 124 or the Internet/Intranet 130 can also be used for a registration and presence application. Since the MSC 104 will not direct a registration request from a handset 120 to the RTX 102 (because it would require changes in the MSC 104), the latter does not have any information of the registered mobile handsets 120. To circumvent this issue, a registration and presence application runs over an IP stack in the handset 120. After the handset 120 registers for a data interface (i.e., obtaining an IP address) with the PDSN 126 (or Serving GSM Service Nodes (SGSN) in the case of GSM networks), the registration and presence application in the handset 120 registers with the RTX 102 using its IP address. The RTX 102 also uses this IP interface to update the presence information of other group members to a handset 120.

An alternative embodiment would use the SMS (Short Message Service) transport to carry presence messages over a data channel. The RTX 102 interacts with the mobile handset 120 using predefined presence application related messages that are transported as SMS messages. The same messages can be transported via the PDSN 126 interface, if group users have data service.

Real Time Exchange

Figure 2:
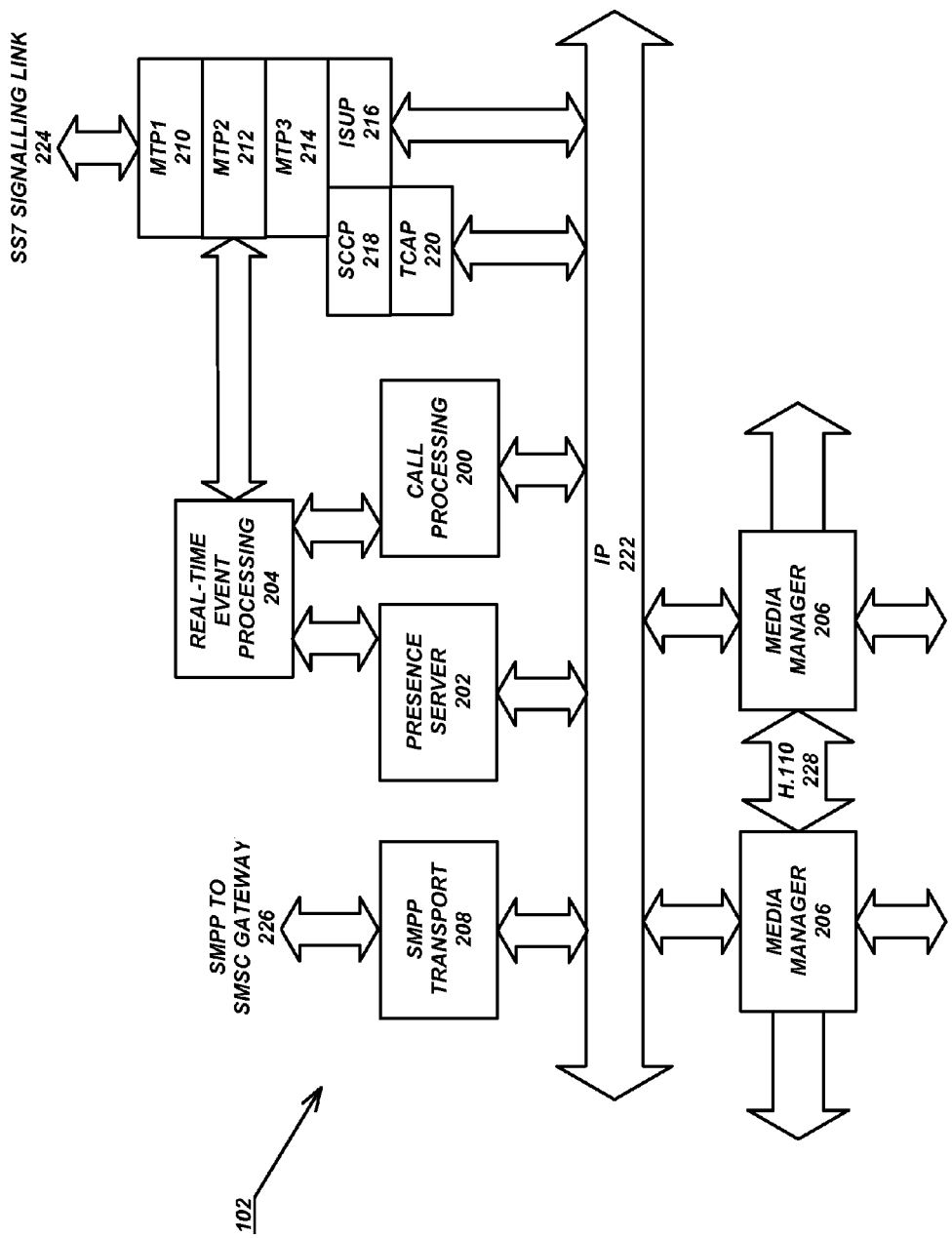
FIG. 2 illustrates a proposed architecture for a real-time exchange according to the preferred embodiment of the present invention.

FIG. 2 illustrates a proposed architecture for the RTX 102 according to the preferred embodiment of the present invention.

The architecture includes a Call Processing system 200, Presence Server 202, Real-Time Event Processing system 204, one or more Media Managers 206, and an SMPP (Short Message Peer-to-Peer) Transport 208, as well as modules for various SS7 protocols, such as MTP-1 (Message Transfer Part Level 1) 210, MTP-2 (Message Transfer Part Level 2) 212, MTP-3 (Message Transfer Part Level 3) 214, ISUP (Integrated Services Digital Network User Part) 216, SCCP (Signaling Connection Control Part) 218, and TCAP (Transactions Capabilities Application Part) 220 protocols.

The Call Processing system 200, Presence Server 202, Media Managers 204, SMPP Transport 206, and other modules communicate across an IP network 222. The Real-Time Event Processing system 204 communicates directly with the Call Processing system 200, Presence Server 202, and the modules for various SS7 protocols. The modules for various SS7 protocols communicate with other entities via a SS7 Signaling Link 224. The SMPP Transport 206 communicates with a SMSC (Short Message Service Center) gateway using the SMPP protocol 226. The Media Managers 204 communicate among themselves using the H.110 protocol 228 (or some other protocol, such TCP/IP).

The operation of these various components are described in the co-pending and commonly-assigned patent applications cross-referenced above and incorporated by reference herein.

P2T State Diagram

Figure 3:
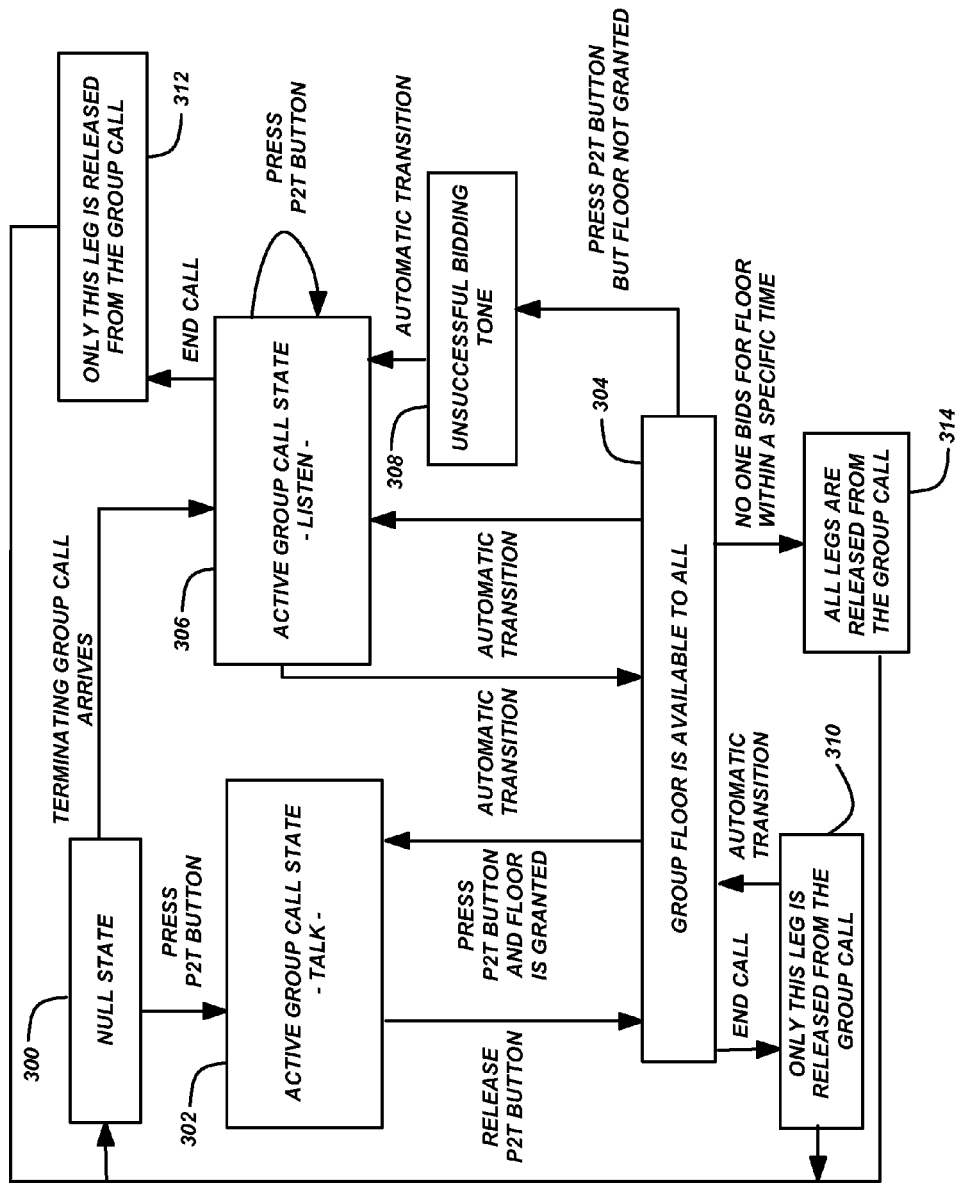
FIG. 3 is a state diagram that illustrates the operation of a push-to-talk call according to a preferred embodiment of the present invention.

FIG. 3 is a state diagram that illustrates the operation of a P2T call according to a preferred embodiment of the present invention.

State 300 represents a mobile handset 120 in a NULL state, i.e., the start of the logic. A user pressing a P2T button or making a request to terminate a group call triggers a transition out of this state.

State 302 represents a mobile handset 120 in an active group call state. In this state, the user receives a chirp tone to start talking. The user responds by pressing the P2T button on the mobile handset 120 and talking. A talking user must hold the P2T button. The mobile handset 120 ensures that only when the user presses the P2T button is the reverse traffic channel is used to send voice frames, and the RTX 102 switches voice frames only in one direction, i.e., from talker to listener, which ensures the half-duplex operation required for a P2T call.

State 304 represents the group "floor" being available to all members of the group. When the talking user releases the P2T button, the floor is available to all group members. All members of the group receive a "free floor" tone on their mobile handset 120. A user who requests the floor by pressing the P2T button first (in the "free-floor" state) is assigned the floor, wherein the network 100 sends a chirp tone to the successful user.

State 306 represents a mobile handset 120 being in an active group call state. In this state, the user is listening to the group call. If a non-talking user presses the P2T button in a call active state, the user does not receive any response from the network 100 and remains in the same functional state.

State 308 represents a user receiving an "unsuccessful bidding" tone on his mobile handset 120, after the user pressed the P2T button, but was not granted the floor of the group call. The user subsequently starts listening to the voice message of the talking user.

Non-talking users (including the talking user who must release the P2T button to end the call thus becoming non-talking and making the floor available for others) can request the network 100 to end their respective call legs explicitly.

State 310 represents a terminating leg being released from the group call after the user ends the call.

State 312 also represents a terminating leg being released from the group call after the user ends the call.

State 314 represents all terminating legs being released from the group call when no member of the group bids for the floor within a specified time period.

Mobile Handset Components

Figure 4:
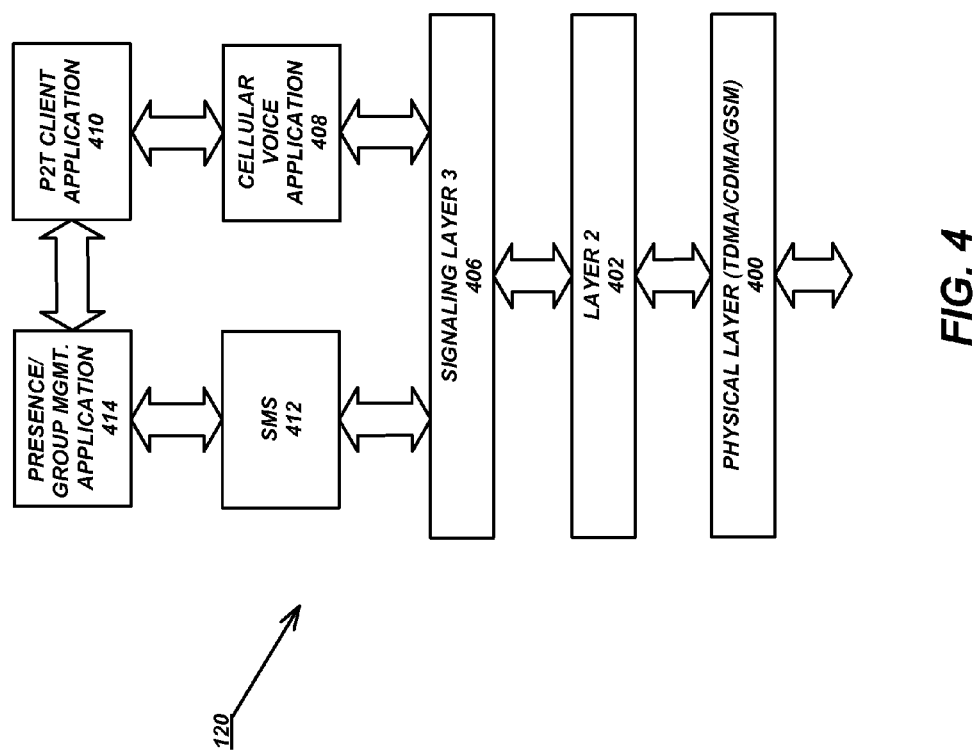
FIG. 4 illustrates the high-level functional components and their interfaces inside a mobile handset according to a preferred embodiment of the present invention.

FIG. 4 illustrates the high-level functional components and their interfaces inside the mobile handset 120 according to a preferred embodiment of the present invention. The high-level functional components and their interfaces include a physical layer 400, layer 2 402, signaling layer 3 406, cellular voice application 408, P2T client application 410, SMS (or USSD (Unstructured Supplementary Services Data) or GPRS (General Packet Radio Service)) application 412 and presence/group management application 414.

Note that P2T client application 410 and presence/group management application 414 are incorporated without requiring any changes in signaling layer 3 406 and below. All the existing messages that the cellular voice application 408 and SMS application 412 use remain as is and no additional messages are required to be implemented.

The P2T client application 410 performs all the call signaling states described in FIG. 3, which are the same that are traversed through by the cellular voice application 408. However, in some cases, the actions or behaviors in a particular state may vary.

As an example, for terminating a P2T call, the P2T client application 410 in an "alerting" state does not play an alerting tone to the user and wait for user action. Instead, it plays a small duration "alert" tone, sends a "connect" message immediately to the network 100 and joins the vocoder output to a speaker on the handset 120. (Alternatively, the handset 120 could answer the call, and the RTX 102 plays the tone.)

Similarly, the presence/group management application 414 messages are tunneled via SMS (or USSD or GPRS) messages and delivered to the SMS application 412 by Layer 3 signaling 406, and vice versa. These messages are identified and handed over to the presence/group management application 414 for decoding. In one embodiment, the Wireless Village protocol messages are used between the handset 120 and the RTX 102 for presence and group management operations, although other messages could be used as well.

P2T Client Application and Presence/Group Management Application

Figure 5:
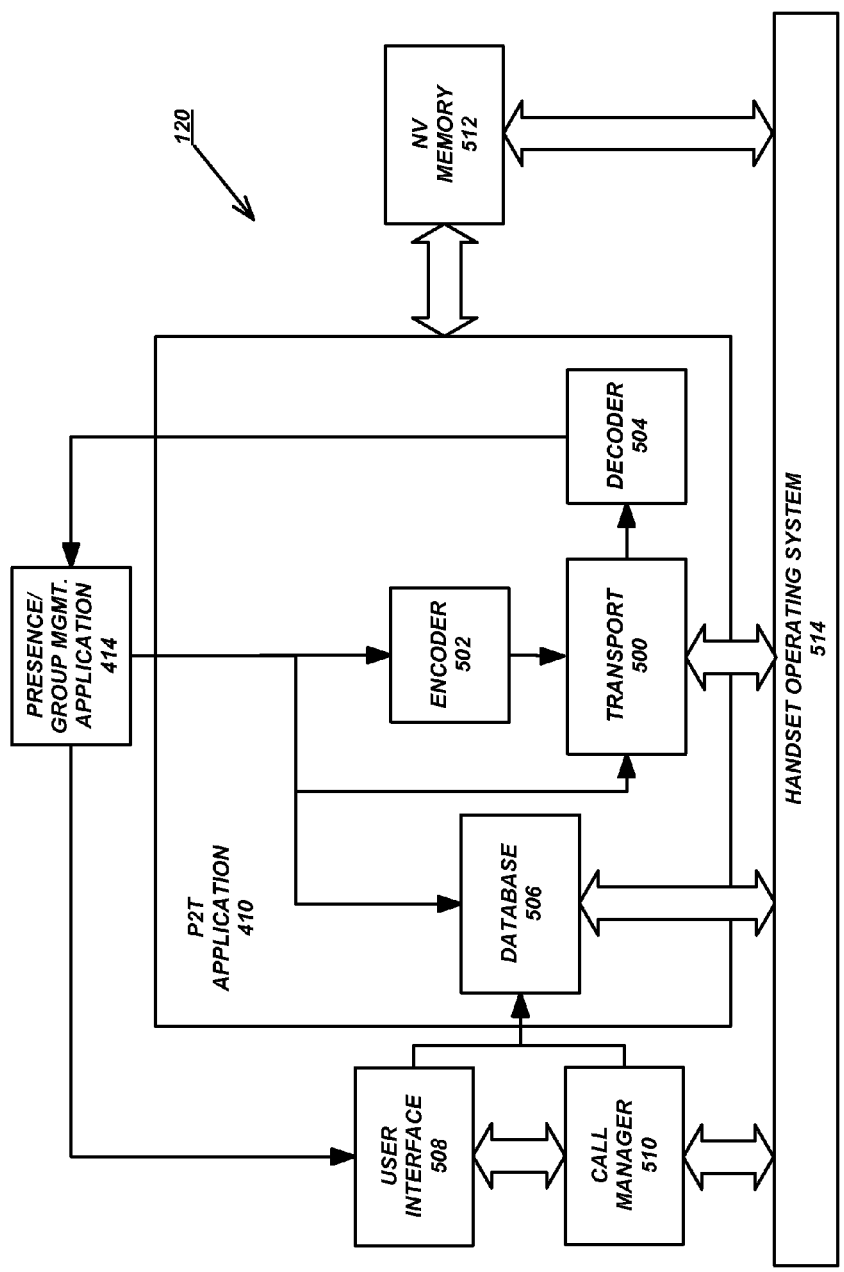
FIG. 5 illustrates the high-level functional components of the push-to-talk client application and presence/group management application according to a preferred embodiment of the present invention.

FIG. 5 illustrates the high-level functional components of the P2T client application 410 and the presence/group management application 414 according to a preferred embodiment of the present invention.

In this embodiment, the P2T client application 410 includes a message transport layer 500, encoder 502, decoder 504 and database 506. In addition, the P2T client application 410 provides an application programming interface (API) for use by other components of the handset 120.

Other components in the handset 120 that use the API of the P2T client application 410 include the presence/group management application 414, a user interface 508, call manager 510 and non-volatile (NV) memory 512.

The transport layer 500 delivers encoded messages from the handset 120 to a destination presence server 202 in the RTX 102. The media used to transport these messages could be SMS, USSD or GPRS. The transport layer 500 can be configured for any of these media based on the configuration parameters.

The transport layer 500 implements a queue to transport the messages from the handset 120. The transport layer 500 also notifies the upper layer modules, such as the presence/group management application 414, about the failure or success of the message transport. In case of any failures in sending the messages, the transport layer 500 handles the re-transmission of the messages. The retransmission parameters are configurable and can be modified at run time without affecting the other module functionalities.

As noted above, the presence server 202 and handset 120 communicate using Wireless Village messages. The encoder 502 encodes the Wireless Village messages, and handles message fragmentation, if necessary.

The decoder 504 decodes incoming Wireless Village messages from the RTX 102 and populates specific data structures in the handset 120. The decoder 504 checks the validity of the incoming messages by verifying mandatory parameters for each of the incoming messages. A message will not be processed further if the decoder 504 fails to decode the message.

The presence/group management application 414 does the most of the processing of the Wireless Village messages. The decoded message from decoder 504 is sent to the presence/group management application 414 to take the appropriate action. In this regard, the presence/group management application 414 may interact with the encoder 502, database 506, transport layer 500 or user interface 508.

The presence/group management application 414 enables P2T subscribers to track the presence of fellow members of the group in the network 100 on their mobile handsets 120. It also provides a mechanism and API to carry-out group management operations on the handset 120, such as add member, delete member, etc. The communication interface between presence/group management application 414 and the presence server 202 in the RTX 102 may rely on either SMS (or USSD or GPRS) messages for transport.

Since most of the presence information is stored in the database 506, the database 506 is tightly integrated with the presence/group management application 414. The database 506 stores groups, contacts, presence and availability related information in the NV memory 512. The database 506 information essentially contains group and member information along with presence information associated with each group and member. Apart from group and member information, the database 506 also stores subscriber information, such as privileges, presence information, etc. The other components of the handset 120 may interact with the database 506 to retrieve/update the group, members and presence information for various operations. The database 506 also has pointers to the native address book on the handset 120, which is stored in the NV memory 512, to provide seamless "alias" naming for contacts between cellular calls and P2T calls.

The user interface 508 provides a mechanism for the user to view and manage groups, group members, contacts, presence and availability. The user interface 598 also makes it possible to make P2T calls from the group/contact list screens.

The call manager 510 handles all the telephony related functionalities, such as P2T Group/Private/Dynamic Group calls. The call manager 510 implementation is device-specific and vendor-specific, and it interacts with the user interface 508 and database 506. The required information for call-related functionalities is obtained from the wrappers provided by the database 506.

The NV memory 512 is also used to store the configuration parameters, which can be updated by the RTX as required.

User Interactions with the Mobile Handset

This section describes various scenarios that a group user may explicitly invoke through the mobile handset 120.

TABLE 1

User Interactions with the Mobile Handset

| No. | User action | Action by the P2T client application 410 and presence/group management application 414 in the handset 120 | Remarks |
|---|---|---|---|
| 1. | The user powers on the handset 120. | The presence/group management application 414 is notified when the handset 120 is turned on. The presence/group management application 414 sends a "presence registration" message to the home RTX 102. The presence/group management application 414 interacts with the SMS application 412 to transport this message to the SMSC gateway and the SMSC gateway routes the message to the home RTX 102 via the IP network 124 (as e-mail). | Each handset 120 is configured with the address of the home RTX 102 when it is provisioned for group service. |
| 2. | The user powers off the handset 120. | The presence/group management application 414 is notified when the handset 120 is turned off. The presence/group management application 414 sends a predefined "presence registration" message to the home RTX 102. The presence/group | |

TABLE 1-continued

User Interactions with the Mobile Handset

| No. | User action | Action by the P2T client application 410 and presence/group management application 414 in the handset 120 | Remarks |
|---|---|---|---|
| | | management application 414 interacts with the SMS application 412 to transport this message to the SMSC gateway and the SMSC gateway routes this message to the home RTX 102 via the IP network 124 (as e-mail). | |
| 3. | The user presses the P2T button on the handset 120 to contact the default group. | The P2T client application 410 is invoked. It sends a call origination message with the called party's address parameter filled with a DP trigger code, a code to identify a private/group call and the default group id. A bearer path is set up and the vocoder input/output is connected to the microphone and speaker of the handset 120, respectively. | The MSC 104, based on the DP trigger, sends a query to the RTX 102 with the called party's address. The RTX 102 responds with its routing number and sets up the terminating legs for the group. The call setup is performed in parallel in order to improve call setup time. |
| 4. | The user selects a particular group from a list of groups displayed on the handset 120 and presses the P2T button. | The P2T client application 410 is invoked. It sends a call origination message with the called party's address parameter filled with a DP trigger code, a code to identify the private/group call, and the selected MS-ISDN/group id. A bearer path is set up and the vocoder input/output is connected to the microphone and speaker of the handset 120, respectively. | |
| 5. | The user wants to make a private call and presses the P2T button. (A private call involves only two parties. The called party in a private call may be a member of his/her subscribed group or he/she can enter called party's MS-ISDN number explicitly). | The P2T client application 410 is invoked. (A private call is considered a group call where only two parties are involved). It sends a call origination message with the called party's address parameter filled with a DP Trigger code, a code to identify a private/group call and the selected MS-ISDN number. A bearer path is set up and the vocoder input/output is to the microphone and speaker of the handset 120, respectively. | The RTX 102 should be able to isolate the MS-ISDN number and group id based on the code. |
| 6. | The user selects a particular group from the list of groups displayed on the handset, marks a set of members and then presses the P2T button. | The P2T client application 410 is invoked. It sends a call origination message with the called party's address parameter filled with a DP Trigger code, a selected group id and the positions of the marked members within the group. A bearer path is set up and the vocoder | |

TABLE 1-continued

User Interactions with the Mobile Handset

| No. | User action | Action by the P2T client application 410 and presence/group management application 414 in the handset 120 | Remarks |
|---|---|---|---|
| | | input/output is connected to the microphone and speaker of the handset 120, respectively. | |
| 7. | While in a group call active state, the user releases the P2T button to free the floor. | The P2T client application 410 sends a "#" as an in-band DTMF signal to the BSC 112. The BSC 112 injects this DTMF signal into the PCM stream. | |
| 8. | While in a group call active state, the user presses the P2T button to get the floor. | The P2T client application 410 sends a "*" as an out of band DTMF signal to the BSC 112. The BSC 112 injects this DTMF signal into the PCM stream. | |
| 9. | While in a group call active state, the user presses the "End" button explicitly to release the group call. | The P2T client application 410 sends a call release message to the MSC 104. The MSC 104 requests the handset 120 to clear its call states and sends a release message to the RTX 102. The RTX 102 releases that user's leg from the group call. | |

Note that the P2T client application 410 and presence/group management application 414 also may manage a P2C (Press-To-Conference) session in a manner similar to a P2T session. More information on P2C sessions can be found in the co-pending and common-assigned patent application Serial Number PCT/US04/23038, filed on Jul. 16, 2004, by F. Craig Farrill, Bruce D. Lawler, and Krishnakant M. Patel, entitled PREMIUM VOICE SERVICES FOR WIRELESS COMMUNICATIONS SYSTEMS, which application is incorporated by reference herein.

Network Interactions with the Mobile Handset

This section outlines scenarios that occur when the P2T client application 410 and presence/group management application 414 in the mobile handset 120 interact with the network 100. Note that user is not aware of these scenarios as the P2T client application 410 and presence/group management application 414 in the mobile handset 120 handle these network-generated events in the background.

TABLE 2

Network Interactions with the Mobile Handset

| No. | Causing Event/Scenario in Mobile | Action by P2T client application 410 and presence/group management application 414 in the Mobile Handset 120 | Remarks |
|---|---|---|---|
| 1. | A cellular call terminates to the handset 120 which the calling party starts with a "*" (in an alerting state). The call termination identifier can | The P2T client application 410 is invoked. It does not play an alerting tone to the user as specified in the "Alert With Info" | The indicator for group call in the calling party's address should be unique enough so that it is never used in a cellular call. |

TABLE 2-continued

Network Interactions with the Mobile Handset

| No. | Causing Event/Scenario in Mobile | Action by P2T client application 410 and presence/group management application 414 in the Mobile Handset 120 | Remarks |
|---|---|---|---|
| | be either a prefix or a suffix. | message. Instead, it plays a small duration (e.g., 200 ms) special group call terminating alerting tone, immediately sends a connect message to the network 100, and connects the vocoder output to the speaker of the handset 120. | |
| 2. | While in a group call active state, a release event is received from the network 100. | The P2T client application 410 releases allocated resources in the handset 120 and sends a "release complete" message to the network 100. There are two possible scenarios: (1) the originator disconnects and the call goes on, or (2) the originator disconnects and the entire call is ended. | |
| 3. | A Presence Update Notification message is delivered through the SMS interface. | The presence/group management application 414 is invoked to decode the message. It adds/deletes/modifies the member's information with the presence information in the specific group indicated in the message. There is a special WV delimiter that differentiates this from regular SMS/data. | |
| 4. | An Auto Configuration Update message is delivered through the SMS application 412. This message is received only once when a user is provisioned for group voice service. | The presence/group management application 414 is invoked to decode the message. Configuration parameters for the P2T client application 410 and presence/group management application 414 are set. | |

Service Interactions with the P2T Client Application

A handset 120 can support either cellular or group voice service at any instant of time. This section highlights various scenarios when the two services may conflict with each other. In some of these cases, the user's intervention is needed to select one of the services, whereas other cases are decided by the P2T client application 412 itself as part of the call processing logic. This section also discusses the impact of other cellular services, such as call hold, call forwarding, call forwarding busy, call waiting, call forwarding no answer, etc., on group voice services.

The following table has been prepared with the assumption that, while using group voice services, a user cannot put other parties on hold, even though they can switch to another call without disconnecting the group call leg. However, a user can leave a group call session at any time by selecting an "end" soft key. The objective is to allow group members to continue with the call, while one or more legs can either be released from the RTX 102 or disjoined at the MSC 104 (at the time of service switching) during a session. The network 100 releases a group call only when the floor remains free for some predefined time. If a talking user leaves the session, the network 100 will make the floor available to all others.

It is also assumed that a member of a group has call waiting, calling number presentation at call waiting, call forwarding busy (to voicemail) and calling line identity presentation features enabled on the handset 120.

TABLE 3

Service Interactions for the P2T client application

| No. | Present State (in Mobile) | Triggering Event | Action by the P2T client application 410 and presence/group management application 414 in the Mobile Handset 120 | Remarks |
|---|---|---|---|---|
| 1. | A group voice call is in an active state and the user is talking with the P2T button pressed. | Another group or cellular call is being terminated by the MSC 104 and a call-waiting tone is played. The user is prompted to accept the second call. The following scenarios can occur: (1) the user releases the P2T button and accepts the second call; (2) the user releases the P2T button, ends the active call and accepts the second call; (3) the user does not accept the waiting second call and continues with the first call. | (1) In this case, the P2T client application 410 sends a DTMF signal to free the floor. Next, the P2T client application 410 sends a "Flash with Info" message to accept the second call, while the first call is broken at the MSC 104. After attending to the second call, the user may toggle to the first call. (2) In this case, the P2T client application 410 sends a DTMF signal to free the floor. Next, it releases the active call and the second call is established. (3) The MSC 104 handles the second call using a "call forwarding no answer" feature provisioned for the user. | For (1), the user remains as a non-talking leg to the RTX 102, even though the circuit is broken at the MSC 104. The RTX 102 may release all legs of the call at any time. |
| 2. | A group voice call is in an active state and the user is not talking (i.e., does not press the P2T button). | Another group or cellular call is being terminated by the MSC 104 and the call-waiting tone is played. The user is prompted to accept the second call. The following scenarios can occur: (1) the user accepts the second call, (2) the user ends the active call and accepts the second call, or (3) the user does not accept the waiting call and continues with the first call. | (1) In this case, the P2T client application 410 sends a "Flash with Info" message to accept the second call, while the first call is broken at the MSC 104. After attending to the second call, the user may toggle to the first call. (2) In this case, the P2T client application 410 releases the active call and the second call is established. (3) In this case, the MSC 104 handles the second call using the "call forwarding no answer" feature provisioned for the user. | |

TABLE 3-continued

Service Interactions for the P2T client application

| No. | Present State (in Mobile) | Triggering Event | Action by the P2T client application 410 and presence/group management application 414 in the Mobile Handset 120 | Remarks |
| --- | --- | --- | --- | --- |
| 3. | A cellular voice call is in an active state | Another group call is terminated by the MSC 104 and the "call-waiting" tone is played. The user's action is similar to the previous case. | Similar to the previous case. | |
| 4. | A group call is in an active state and the user is talking with the P2T button pressed. | The user wants to originate another cellular call. The following scenarios may occur: (1) The user releases the P2T button and originates the second call, or (2) the user releases the P2T button, ends the first active call, and originates the second call (the user can originate a group call as well). | (1) In this case, the P2T client application 410 sends a DTMF signal to free the floor. Next, the P2T client application 410 sends a "Flash with Info" message to originate the second cellular call, while the first call is broken at the MSC 104. After attending to the second call, the user may toggle to the first call. (2) In this case, the P2T client application 410 sends a DTMF signal to free the floor. Next, the P2T client application 410 releases the active call and then originates a cellular or group call (by pressing the P2T button. | The first case may lead to a 3-party call, which should be avoided from a group call perspective. |
| 5. | A group call is in an active state with a non-talking user (the P2T button is free). | The user wants to originate another cellular call. The following scenarios may occur: (1) the user originates a second cellular call, or (2) the user ends the first active call and originates a second call (the user can also originate a group call). | (1) In this case, the P2T client application 410 sends a "Flash with Info" message to originate the second cellular call, while the first call is broken at the MSC 104. After attending to the second call, the user may toggle to the first call. (2) In this case, the P2T client application 410 releases the active call and then originates a cellular or group call (by pressing the P2T button). | |

TABLE 3-continued

Service Interactions for the P2T client application

| No. | Present State (in Mobile) | Triggering Event | Action by the P2T client application 410 and presence/group management application 414 in the Mobile Handset 120 | Remarks |
| --- | --- | --- | --- | --- |
| 6. | A cellular voice call is in an active state. | The user wants to originate a P2T call. The following scenarios may occur: (1) the user originates a second P2T call by pressing the P2T button, or (2) the user ends the first active call and originates a second P2T call. | (1) In this case, the P2T client application 410 sends a "Flash with Info" message to originate the second P2T call, while the first call is broken at the MSC 104. After attending to the second call, the user may toggle to the first call. (2) In this case, the P2T client application 410 releases the active call and then originates a group call (by pressing the P2T button). | |

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An apparatus for providing group voice services in a wireless network, comprising:
    a mobile unit for communicating with a wireless network in order to provide group voice services with other mobile units;
    the wireless network including a real-time exchange to provide the group voice services therein;
    both the real-time exchange and the mobile unit providing the group voice services using call setup and in-band signaling within the wireless network;
    the real-time exchange switching the voice frames for the group voice services from an originating mobile unit to all terminating mobile units across bearer paths in the wireless network;
    the mobile unit executing a client application therein for performing the call setup and in-band signaling with the wireless network for the group voice services; and
    the mobile unit executing a presence/group management application therein for performing presence and group management functions related to the group voice services in the mobile unit.

2. The apparatus of claim 1, wherein the group voice services comprises a Push To Talk (P2T) service.

3. The apparatus of claim 1, wherein the client application provides instant two-way half-duplex voice messaging within a group of users of the wireless network.

4. The apparatus of claim 1, wherein the presence/group management application enables subscribers to track the presence of fellow members of a group in the network on their mobile units.

5. The apparatus of claim 1, wherein the presence/group management application provides a mechanism and application programming interface (API) to carry-out group management operations on the mobile unit.

6. The apparatus of claim 1, wherein the client application includes a group and member database for storing group-related and member-related information.

7. The apparatus of claim 1, wherein the mobile unit exchanges a set of defined in-band DTMF tones with the real-time exchange within the wireless network as call control events to regulate a group call.

8. A method of providing group voice services in a wireless network, comprising:
    communicating between a mobile unit and a wireless network in order to provide group voice services with other mobile units, wherein the wireless network includes a real-time exchange to provide the group voice services therein and both the real-time exchange and the mobile unit provide the group voice services using call setup and in-band signaling within the wireless network;
    switching the voice frames for the group voice services in the real-time exchange from an originating mobile unit to all terminating mobile units across bearer paths in the wireless network;

executing a client application in the mobile unit for performing the call setup and in-band signaling with the wireless network for the group voice services; and executing a presence/group management application in the mobile unit for performing presence and group management functions related to the group voice services in the mobile unit.

9. The method of claim 8, wherein the group voice services comprises a Push To Talk (P2T) service.

10. The method of claim 8, wherein the client application provides instant two-way half-duplex voice messaging within a group of users of the wireless network.

11. The method of claim 8, wherein the presence/group management application enables subscribers to track the presence of fellow members of a group in the network on their mobile units.

12. The method of claim 8, wherein the presence/group management application provides a mechanism and application programming interface (API) to carry-out group management operations on the mobile unit.

13. The method of claim 8, wherein the client application includes a group and member database for storing group-related and member-related information.

14. The method of claim 8, wherein the mobile unit exchanges a set of defined in-band DTMF tones with the real-time exchange within the wireless network as call control events to regulate a group call.

* * * * *

UNITED STATES PATENT AND TRADEMARK OFFICE
CERTIFICATE OF CORRECTION

PATENT NO. : 7,738,892 B2
APPLICATION NO. : 11/126587
DATED : June 15, 2010
INVENTOR(S) : Ayyasamy et al.

It is certified that error appears in the above-identified patent and that said Letters Patent is hereby corrected as shown below:

Title Page

Under Item (56) References Cited, U.S. PATENT DOCUMENTS, please insert

--2002/01967181   12/2002   Salovuori--.

Signed and Sealed this

Fifth Day of October, 2010

David J. Kappos
*Director of the United States Patent and Trademark Office*